Sept. 7, 1948.   W. J. HAMPSHIRE   2,448,712
MEANS FOR CONTROLLING THE OPERATION OF WING
AND TAIL-PLANE ELEMENTS OF AN AIRPLANE
Filed Feb. 26, 1944   4 Sheets-Sheet 1
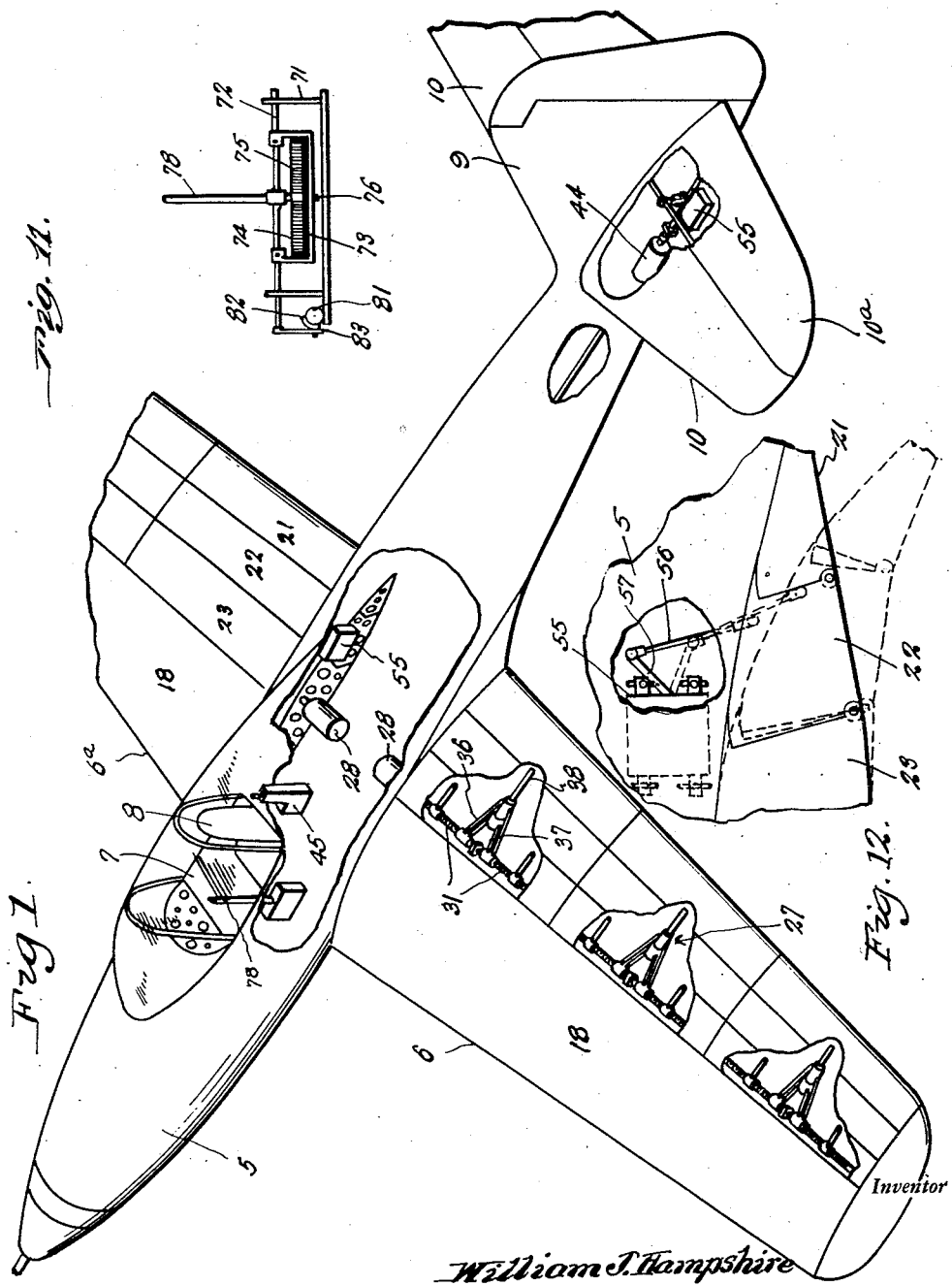
Inventor
William J. Hampshire
By Clarence A. O'Brien
and Harvey B. Jacobson
Attorneys

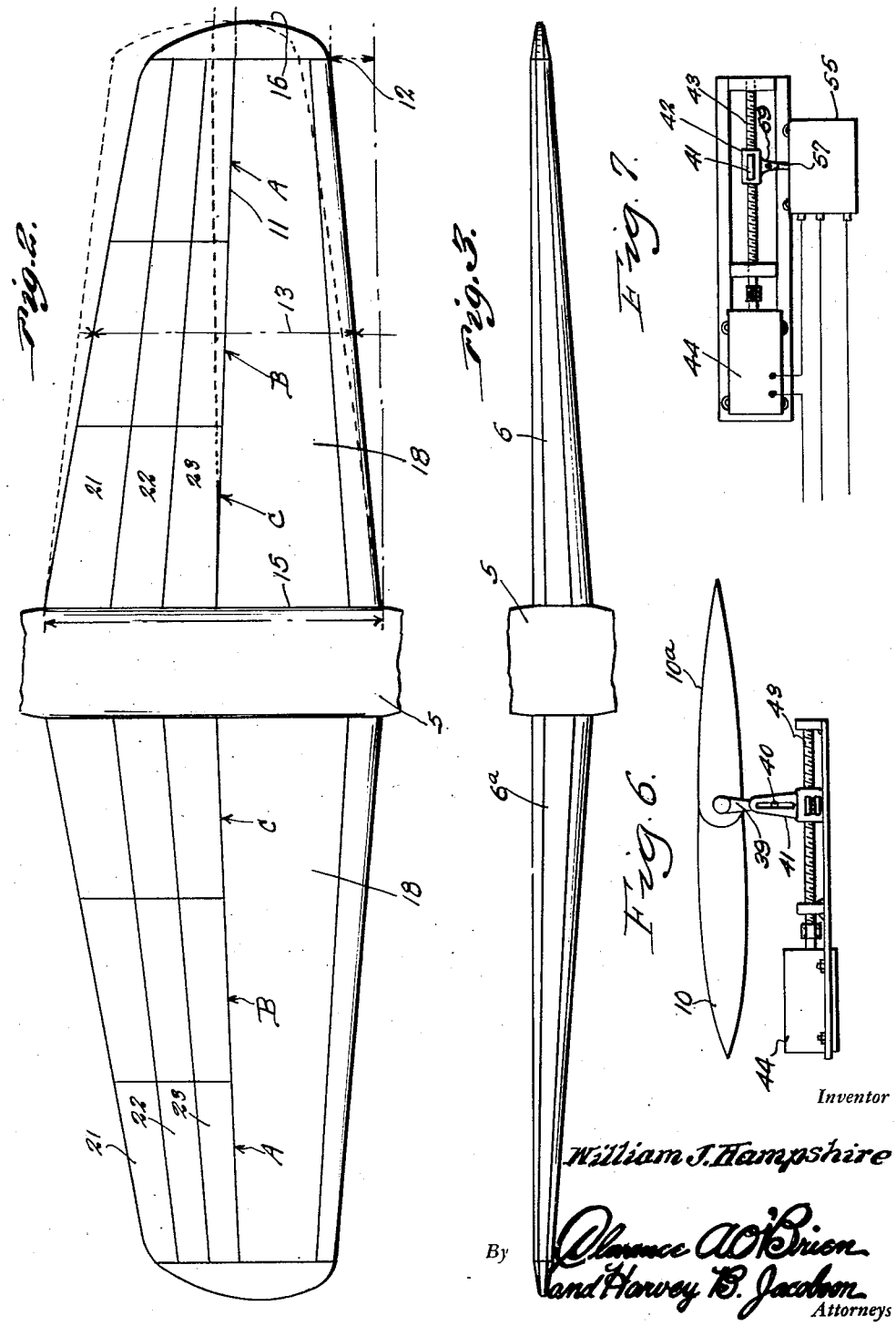

Sept. 7, 1948.   W. J. HAMPSHIRE   2,448,712
MEANS FOR CONTROLLING THE OPERATION OF WING
AND TAIL-PLANE ELEMENTS OF AN AIRPLANE
Filed Feb. 26, 1944   4 Sheets-Sheet 3
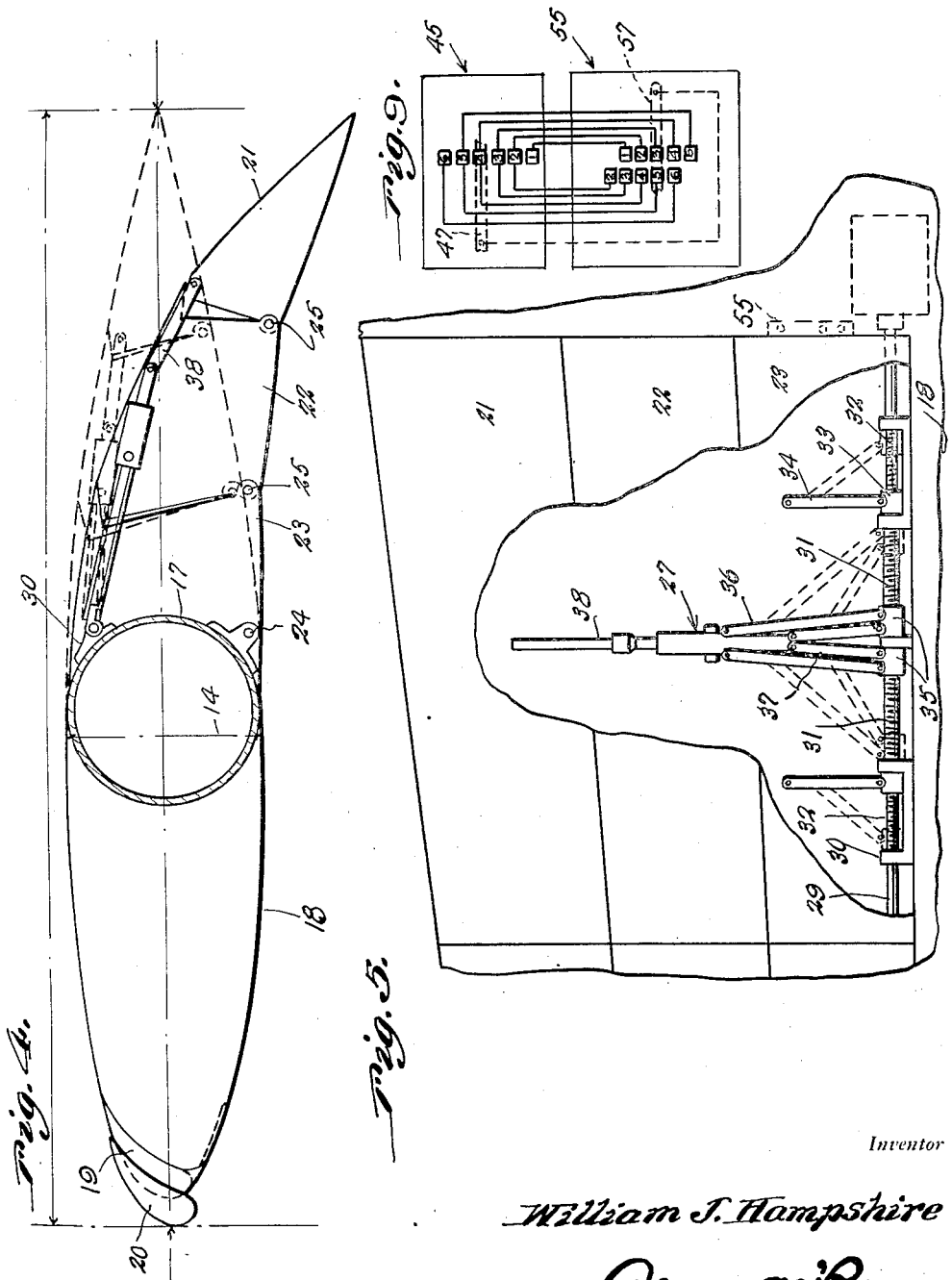
Inventor
William J. Hampshire
By Clarence A. O'Brien
and Harvey B. Jacobson
Attorneys

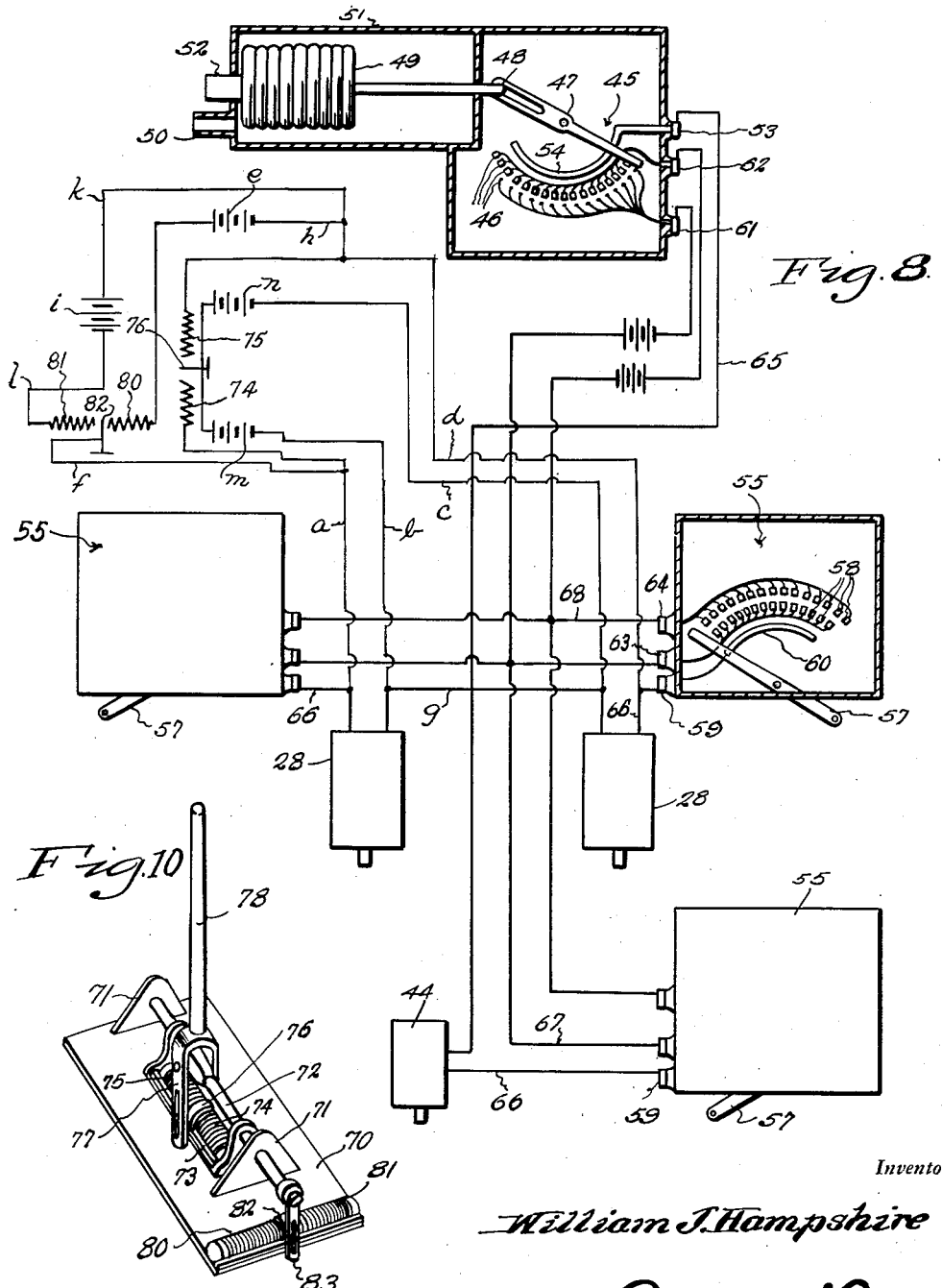

Patented Sept. 7, 1948

2,448,712

UNITED STATES PATENT OFFICE 2,448,712

MEANS FOR CONTROLLING THE OPERATION OF WING AND TAIL-PLANE ELEMENTS OF AN AIRPLANE

William J. Hampshire, Cygnet, Ohio

Application February 26, 1944, Serial No. 524,045

4 Claims. (Cl. 244—44)

This invention relates to improvements in airplanes, and the primary object of the invention is to provide mechanisms in the wing panels and the tail plane of an airplane that are operated together by electrical means so as to effect automatic trim for all directional flight.

Another object of the invention is to provide improvements in the form of the panels of an airplane wing, whereby the same is most effectively suited to use of the automatic trim mechanism to combine speed and performance or maneuverability.

Another object of the invention is to provide improved means for obtaining rolling action of the airplane without the use of ailerons and by means of a "stick"-operated reversible switch controlling motor-operated mechanism for shifting relatively movable hingedly connected wing sections.

Other objects of the invention are to provide improved mounting and operating means for jack mechanisms controlling the movable wing sections, and for correlating parts of the electrical mechanism with the wing sections.

The present invention was inspired by the need of better performance in high speed aircraft. At the present time, either speed or performance (maneuverability) must be sacrificed, one for the other. Each design has had its limits for use because of special features incorporated, the limits being greatly dependent upon wing design. The wing loading at present nearly determines performance, the ship having small wing loading being reasonably slower but performing well, and the ship having a large wing loading being characterized by fair performance and speed. These statements are general, however, as there are many other things that enter into actual performance calculations. The point is that designers have never been able to combine the best features of speed and maneuverability in the same airplane, although they have approached it to a reasonable extent in several types of modern combat ships. However, there has always been a tendency to sacrifice maneuverability for speed, and the purpose of this invention is to make possible the combination of speed, maneuverability, long range, and more horsepower per weight in the same airplane by controlling automatically the lift needed for each change in velocity during operation.

The present invention includes a new type of automatically controlled high lifting wing which is coordinated to operate in conjunction with the horizontal tail plane to control the center of pressure travel. Mechanisms in both wing panels and the tail plane are operated together by electrical means for effecting automatic trim for all directional flight. When the wing changes to the high lift position for slow speeds, the center of pressure moves far forward of normal, thus causing a needed "up" load on the tail surface, so the trailing edge of the elevator is lowered by the system.

The exact nature of the present invention will become more clearly apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is a somewhat diagrammatic perspective view of an airplane embodying the present invention, one of the wings being broken away, and the fuselage, one of the wing panels and one of the tail planes being broken away to reveal parts of the invention located therein.

Figure 2 is a top plan view of the wing and the adjacent portion of the fuselage forming part of the airplane shown in Figure 1.

Figure 3 is a front elevational view thereof.

Figure 4 is a sectional view, partly diagrammatic, showing a typical transverse section of one of the wing panels, together with associated parts.

Figure 5 is a fragmentary plan view of one of the wing panels, partly broken away to reveal jack mechanism associated with the movable wing sections.

Figure 6 is a side elevational view showing the operating mechanism for the movable section of the tail plane.

Figure 7 is a plan view of the construction shown in Figure 6 with the tail plane omitted.

Figure 8 is a view partly in section and partly diagrammatic, illustrating the electrical system forming part of the means for automatically effecting trim for all directional flight of the airplane.

Figure 9 is a wiring diagram showing the relationship of the contacts of coordinated switching devices forming part of the system illustrated in Figure 8, so as to reveal more clearly the theory of operation thereof.

Figure 10 is a perspective view of the "stick" or lever-operated reversible switch for controlling the driving motors which operate the actuating mechanisms for the movable wing sections, whereby to effect any desired differential in lift for the airplane.

Figure 11 is an end elevational view of the construction shown in Figure 10.

Figure 12 is a fragmentary enlarged detail view illustrating the manner of connecting certain control switches of the electrical system shown in Figure 8 with movable wing sections of the airplane.

Referring in detail to the drawings, the present airplane includes a suitable fuselage 5 having wing panels 6 and 6a extending laterally therefrom and provided with a cockpit at 7 containing the aviator's seat 8, the fuselage 5 being provided with the usual vertical tail plane 9 and horizontal tail planes 10 at opposite sides thereof. The tail planes, as shown in Figures 1 and 6, each include a fixed forward section having a vertically swinging elevator or rear section 10a hinged thereto. Thus far described, the airplane may be of general conventional type or design, and the propulsion means for the airplane, which may take any preferred form, has not been shown because it forms no specific part of the present invention.

The wing panels 6 and 6a have a special efficient plan form, being of a rectangular tapered type with an aspect ratio of 5, as shown. Each panel tapers in plan form and thickness, as will be apparent from Figures 2 and 3, the plan form taper ratio being 1–¾. The half-chord line 11 (see Fig. 2) is swept forward .06C root to the tip, giving the wing effective sweep-back, as indicated at 12. A typical section at the mean aerodynamic chord, when the wing panel is in normal condition, is a symmetrical airfoil with a maximum thickness of 14% of the chord at the 45% station 14 (see Fig. 4). The thickness tapers from 18% at the root 15 to 10% at the tip 16. The tips are semi-squared for production simplicity.

A symmetrical airfoil at small angles of attack has no induced drag, so a high aspect ratio is not needed for efficiency. The low aspect ratio aids stressing of the wing. When the airfoil is in a high lift position, the induced drag created helps reduce the landing speed. The small taper ratio affords more area per span and, combined with the swept half-chord line, gives a cushioning effect at slow speeds. A maximum thickness of 18% tapered to 10% at the tips accommodates a large steel tube main spar 17 in the forward supporting section 18 of the wing. The location at 45% is for operation at very high speeds, and the relative wind approaches the wing at small angles so that the slots 19 between the forwardly slidable airfoil 20 and the supporting section 18 are placed high on the leading edge to afford opening without rotating the slot. The stall should not occur before the wing reaches 18%, and the estimated maximum lift coefficient is 3.5.

The trailing 50% of the wing is built up of three divisions A, B and C composed of nine sections, as shown in Figure 3, the sections of each division being respectively indicated at 21, 22 and 23. From root to tip, the divisions are one-third of each panel span, and they are located at 50%, 65% and 80%, respectively, on the airfoil. The sections of each division are hinged to each other longitudinally near the bottom leading edge of each, as at 24, 25 and 26 (see Fig. 4). A folding screw-type jack mechanism 27 driven by a reversible electric motor is connected to the upper leading edge of each section, so that when the operating screw of the jack mechanism is rotated by the motor, the mechanism lowers or raises the sections as desired, according to the direction of rotation. As shown clearly in Figures 1, 4 and 5, the jack mechanisms include a rotary shaft 29 journaled in brackets 30 anchored to the spar 17 and running the full length of the wing panel at the trailing edge of the supporting section 18. This shaft has threaded intermediate portions 31 coincident with each division and smaller threaded portions of different pitch, as at 32, at opposite ends of the portions 31. Nut members 33 are provided on the smaller threaded portions 32 and are connected by links 34 with the forward section of each division. A further pair of nut members 35 are provided on the larger threaded portions 31 and are connected by links 36 with the intermediate section of each division and by links 37 and rod 38 with the rear or trailing section of each division. The motor for driving the shaft 29 of each wing panel is connected to the inboard end of shaft 29 and located within the fuselage, as shown in Figures 1 and 5. The jack mechanism in the tip division of each wing panel has a smaller screw pitch than those in the inboard divisions, because the outer sections do not stall as quickly as the inboard sections. This gives better control in landing.

The elevators 10a have a depending control horn 39 connected by a pin and slot connection, as at 40, with an upstanding arm 41 of a nut member 42 carried by a rotatable operating screw 43 which is driven by a reversible motor 44 housed in the fixed forward tail plane section 10 (see Figs. 6 and 7). By this means, the elevators are raised and lowered, depending upon the direction of rotation of screw 43 by means of motor 44.

The adjustment or movement of the movable wing sections and of the elevators of the tail planes is controlled by a reversible brush-type switch generally indicated at 45 in Figures 1 and 8. This switch includes an arcuate series of contacts 46 over which is movable one end of a switch lever or movable contact 47 whose other end is operatively connected at 48 to a bellows 49 communicating with a pitot static tube. This construction is conventional to the extent that pitot tube 50 for static pressure connects a balance tube (not shown) with the casing 51, and the tube 52 for the dynamic pressure connects the balance tube with the bellows 49. The movable contact arm or lever 47 is in constant electrical connection with a terminal 53 because that terminal is connected with a conductor 54 on which the arm 47 rides at all times. A second brush-type switch 55 is linked, as shown at 56, to the intermediate section of the inboard division of each wing panel, the link connecting said section with a movable contact 57 of switch 55. Movable contact lever 57 is movable over and cooperates with an arcuate series of contacts at 58, and is electrically connected with a terminal 59 at all times by bearing upon a conductor 60. It will be noted that each series of contacts 46 and 58 includes two concentric rows of contacts, and that the contacts of each row are electrically connected to different ones of terminals 61 and 62, respectively and 63 and 64, respectively (see Fig. 8). The terminal 53 is connected by wire 65 with one side of each of the motors 28 for the respective wing panels and to the motor 44 associated with the elevators 10a of the tail planes. The other side of each motor is connected by a wire 66 with the terminal 59 of the associated switch 55. The terminal 63 of each switch 55 is connected by a wire 67 with the terminal 61 of switch 45, while the terminal 64 of each switch 55 is connected by a wire 68 with the terminal 62 of switch 45. It will be apparent that a motor 28 is provided for the jack mechanism of each wing panel; that a switch 55 is operatively connected with a movable wing section of each wing panel, and that another switch 55 is associated with the movable elevators of the tail plane. As shown in Figure 7, the switch 55 associated with the elevators has its movable contact lever 57 connected by a pin and slot connection 69 with the nut member 42 so that said lever 57 is operated simultaneously with movement of the elevators. The arrangement is such that the switches 55 shut off the current to the motors 28 and 44 when the proper position has been reached by the movable wing sections. The movable contacts in the switches 45 and 55 are arranged to change position on ten miles per hour velocity variations. The switch and motor for the tail plane control the center of pressure travel, and the system thereby effects the trim for the entire flexibility range.

The reversible switch principle is shown in Figure 9, wherein contact 47 of switch 45 engages fixed contact No. 4, and switch levers 57 of switches 55 connect fixed contacts Nos. 3 and 5. When the air speed is increased ten miles per hour, contact 47 is moved by the linkage to the bellows 49 up to contact No. 5, the circuit then being complete through 5 and current being sent from negative to positive through the motors. This moves the wing sections and elevators, which in turn shift the contact arms 57 of switches 55 so that the latter shift from the fixed contacts numbered 5 and 3 of the switches 55 to the fixed contacts thereof numbered 6 and 4, whereupon the circuit is broken and the motors stopped. When the air speed decreases ten miles per hour, the reversal of this operation takes place, and it will thus be seen that the airfoil is therefore adjusted at ten miles per hour intervals of the air speed for either acceleration or deceleration.

Turns are made from 110 miles per hour up to the maximum velocity, with radius and degree of bank depending upon the pilot's physical fitness. The airplane does not stall very easily in a bank because the wing performs like a constant speed propeller. The angle and speed of dive are both improved, and the angle is unlimited if a contra-prop is used. The latter would also increase the diving speed, which is tremendous because the section is symmetrical at high speeds and would act as a fin until the termination is started. The pressure needed, for termination of the dive, is independent of speed, so that the steepness of the pull up is again dependent only upon the pilot. The wing loading is very high as compared to conventional designs. In this case, the wing loading does not affect the rate of climb because the airfoil changes from high speed to high lift. More power can be carried, so that the excess horsepower is greater. It remains greater with increase in speed because induced drag decreases as the section becomes symmetrical. When a high forward speed is obtained before the climb is started, the rate of climb approaches rocket speed. The climbing ability is nearly the same at any altitude that the motor operates efficiently, and the service and absolute ceilings are very high.

The cruising speed of a 10,000 pound airplane of the 2,000 H. P. class at 5,000 feet altitude is 396 miles per hour with this invention, and the speed at 3,000 feet is very fast. The same ship lands at 65 miles per hour at sea level and normal atmospheric pressure and temperature, and it glides at 90 miles per hour and descends at an angle approaching 30 degrees. Ground control is good and fast taxiing is safe because lift is destroyed by forward pressure on the control column. Either wheel or stall landings are made with ease and assurance of safety, and the design extends the field of operation and use of any type of airplane, military or commercial.

Since ailerons are not used, rolling action is obtained by a "stick"-operated reversible switch connected directly to each wing motor, as shown in Figures 8 and 10 and 11, which effects any desired differential in lift. This switch includes a base 70 having spaced bearings 71 in which are journaled the ends of a longitudinally arranged shaft 72. Movable with and suspended from the shaft 72 is a cradle 73 carrying rheostats 74 and 75 which are suitably insulated from each other, and along which is slidable a contact or brush carrier 76 operable by a depending arm 77 of a hand lever or "stick" 78. The lever 78 is pivoted to the shaft 72 upon a transverse axis 79, and it is noted that the pivots at the bearings 71 and at 79 are snug friction-type pivots which insure retention of the parts in any position to which they are moved unless manual effort is used to change the position. Another pair of rheostats 80 and 81, which are insulated from each other, is carried by the base plate and a contact or brush 82 is movable along these rheostats and operable by an arm 83 carried by and depending from the rear end of the shaft 72. The wiring diagram is shown in Figure 8, and it will be seen that the arrangement is such that the "stick" or lever 78 moves the contacts or brushes 76 and 82 so as to adjust the rheostat resistance. The rheostats are connected to the motors 28 directly in a manner either to bring about rotation of either motor or rotation of both motors in either desired direction, according to the control desired. For example, if the "stick" 78 is moved to the right to establish a desired bank, the rheostat 80 allows current to flow from the battery through the motors 28 for causing them to rotate in the same direction and causing an opposite movement of the wing mechanisms in the respective wing panels. This brings about the desired differential in lift to establish the bank. When this is done, current flows from battery $e$ through rheostat 80, contact 82, and wires $f$ and $a$ to the left side of the left-hand motor 28. From the right side of left-hand motor 28, the current flows through wire $g$ to the left side of right-hand motor 28, and from the right side of right-hand motor 28 the current flows through wires $d$ and $h$ back to battery $e$. The opposite bank is established by moving the "stick" to the left. When the latter is done, current flows from battery $i$ through wires $k$ and $d$ to the right side of right-hand motor 28. From the left side of the latter motor, the current flows through wire $g$ to the right side of left-hand motor 28, and from the left side of the last-named motor through wires $a$ and $f$, contact 82, rheostat 81 and wire $l$ back to battery $i$. This reverses the motors to establish the opposite bank. To operate the left-hand motor 28 alone, the "stick" is moved forwardly to engage contact 76 with rheostat 74. This allows current to flow from battery $m$ through contact 76, rheostat 74, and wire $a$ to the left side of left-hand motor 28. From the right side of this motor, the current flows through wire $b$ back to battery $m$, the circuit of right-hand motor 28 being open. To operate the right-hand motor 28 alone, the "stick" is moved rearwardly to engage contact 76 with rheostat 75. This allows current to flow from battery $n$ through contact 76, rheostat 75, and wire $d$ to the right side of right-hand motor 28. From the left side of the latter motor, the current flows through wire $c$ back to battery $n$, the circuit of left-hand motor 27 being open.

The wings 6 and 6a have a symmetrical, streamlined cross section, and the trailing portions thereof are adjustable to conform to the contour of a family of airfoils of progressively greater camber. In flight of heavier than air craft, lift is proportional to the square of velocity, wing area, and the characteristics of the type of airfoil used in the design. The characteristics of a conventional airfoil vary with the angle of attack (the angle formed between a reference line through the airfoil called the chord line and the flow of air opposite to the path of motion of the airfoil called relative wind). The performance of the airplane, then, is dependent upon the characteristics of the airfoil it uses. Its performance would be greatly improved if it could use the more favorable characteristics of different airfoils at different speeds. The characteristics of different airfoils vary due to the shape of leading edges, the mean camber or mean curvature of upper or lower surfaces, and to thickness. The most practical prior method of obtaining a greater range of characteristics for a given airfoil is by changing the camber by use of flaps. Flaps are successful at slow speed, but they have disadvantages and are limited in use. The purpose of this invention is to make available to any airplane the desired or most favorable characteristics of a plurality of airfoils, giving it a greater range of efficient operating velocities, or, in engineering parlance, the airplane will operate in the range of best lift over drag ratios for each of a plurality of airfoils used throughout the upper two-thirds of its velocity range. To accomplish this, I have developed a symmetrical streamlined body into a family of airfoils by progressively increasing the percent of camber from 0° in the symmetrical airfoil to approximately 10° in the high lift airfoil. The camber is expressed in percent of wing chord by the standard N. A. C. A. airfoil design procedure. Logically, the highest cambered airfoil is used for slowest speed, and camber is reduced progressively to 0° for maximum velocity. Each airfoil in the family is used through a twenty miles per hour velocity range at its best efficiency. In other words, they are positioned at plus 10 miles per hour variations in velocity by a dynamic pressure controlled electric reversing switch system. The purpose of a plurality of divisions longitudinally of the wings is to conform to the contours of the family of airfoils previously described. The purposes of the span-wide sections are to make possible the use, in the two tip sections, of an airfoil of less camber than those used in the inboard panel divisions. This is necessary to give the wings stable stalling characteristics. The desired stall characteristic is obtained by causing inboard panels to operate at a higher angle of attack thus forcing them to stall before the outboard panels. This reduces the tendency for the airplane to fall off on one wing when it stalls and contributes to safe operation at slow speeds. Another purpose is to distribute the load on the wing mechanism and reduce binding of hinges due to uneven air-dynamic loads in gusty air, that causes slight distortions of the section because the elasticity of metals or wood makes it impossible to build a perfectly rigid structure. Still another reason is to provide for easier and less expensive replacement of damaged or worn out integral sections or parts. The stick 78 may be moved to the right so as to render the left motor 28 operative in the proper direction to increase the camber of the left wing, thereby causing it to rise and establish a bank. When the bank is established, the stick or lever 78 is moved back to neutral or vertical position, rendering the left motor 28 inoperative. The stick is then operated to reverse the left motor 28 so as to return the previously deflected surface to its original position and cause the airplane to maintain the desired bank. The bank is destroyed by reversing the operation used to establish it. It will be noted that only one motor is used to start or stop a turn. Lift on the outside of a turn is increased while the lift on the inside of the wing is undisturbed except by the slight decrease in velocity caused by the turn. This reduces the amount of back pressure needed in the turn to hold altitude. If the stick 78 is moved forward to establish a dive, rheostat 74 allows current to flow from the battery through both motors 28 in series causing them to rotate in the same direction in a manner to decrease the camber of both wings simultaneously. Lift of the left wing is thus reduced while lift on the dynamic balance surface 10 and 10a is undisturbed causing the airplane to nose down and establish a dive. The automatic control system positions the dynamic balance surface 10 and 10a for the increase in velocity, and the airplane is trimmed to hold the diving attitude. It should be noted that the stick 78 has to be returned to neutral or vertical position or the dive will continue to steepen until it becomes a vertical drive, at which point the wing airfoil becomes symmetrical, the increase in velocity will cause the dynamic balance surface 10 and 10a to be moved by the automatic control system to a streamlined or symmetrical position also. When both surfaces are in this symmetrical position, they act only as guiding fins, and the terminal velocity of the airplane will be obtained. It will also be noted that unless the wing airfoil is allowed to travel past a symmetrical condition into a position of negative camber it will be impossible for the airplane to accomplish outside maneuvers or inverted flights. If these maneuvers are desired, the wing mechanism may be altered to incorporate negative camber airfoils in the family of airfoils. Termination of a dive or climb may be established by backward movement of the stick 78, which allows current to flow through rheostat 75 to the motors 28 in series, in a manner to increase camber of both wings simultaneously, thus increasing the lift on both wings and changing the attitude of the airplane so that it is trimmed for the change in velocity by action of the automatic system on the dynamic stabilizer system 10 and 10a. In summary, the functions of the automatic flight control system are to select and mechanically position from a family of airfoils, the airfoil that is most efficient for each 20 miles per hour velocity range of the airplane, from the airplane's minimum velocity up to its maximum velocity; to maintain the fuselage in a position parallel to the relative winds that it will give the least possible drag in all level flights; to air dynamically balance the airplane in all levels and directional flights; and to decrease pilot fatigue on long range flights. The functions of the pilot's control system are to maneuver the airplane in conditions other than level flights; to decrease the labor involved in maneuvering the airplane at high speeds; and to increase the maneuverability of the airplane in the air at all speeds. The pilot's control system works in conjunction with the automatic control system, and since both systems operate simultaneously, it is necessary for three electric motors to be used, one for each wing and one for the air dynamic stabilizer period. For example, in a climbing from level flight at a constant power sitting, the velocity is decreased to when the airplane enters the climb, causing the automatic system to start its operation to change airfoils and trim. The wing motors are rotating at the same speed when the pilot moves the stick 28 to establish a bank, and this allows more current to flow to one of the motors so that it rotates faster than the other. Thus, both wings are changing cambers, but one is changing faster than the other, giving greater lift on that wing and establishing the desired bank.

It will be noted that the various parts of the jack mechanisms are located within the structure of the wing panels, while the switches 55 for the wing panels are mounted in the fuselage adjacent the motors 28 and near the inboard ends of the wing panels.

The construction and operation of the various devices or mechanisms having been individually described as the description progressed, it is believed that the same will be readily understood by those skilled in the art. No attempt has been made herein to go into refinements of construction in great detail because they relate largely to engineering and well known general principles of aircraft construction. Accordingly, the drawings are merely generally illustrative of the principles and ideas involved. For instance, in Figure 5, it can be readily seen that the threaded portions 31 of shaft 29 are of oppositely threaded form to bring about the desired action, and this is true with respect to the portions 32. One need only consider the comparison of full and dotted line position of parts in this figure to realize this fact. Also, in Figure 2, the dotted lines at x show the relative position of the contour if the half-chord line were not moved forward as in accordance with the present invention. It will be apparent that the invention is not restricted to the exact details of construction or type of mechanisms illustrated, but merely to their equivalents, in so far as bringing about the desired results are concerned.

What I claim as new is:

1. In an airplane, the combination of a fuselage having oppositely extending wing panels, each of said panels being provided with a plurality of trailing divisions, each composed of a plurality of hinged sections movable to vary the lift of said panels, means associated with each panel to simultaneously move the hinged sections of its divisions with a differential movement between the sections of each division and between those of the outboard and inboard divisions, a reversible motor for operating each of said last-named means, dynamic pressure controlled reversing switch means responsive to predetermined variations in the speed of the airplane to automatically place said motors in operation in the proper direction and speed according to increase or decrease of said speed, and further switch means operatively connected with a movable section of each wing panel to automatically render said motors inoperative when the movable wing sections have been moved predetermined distances for varying the lift of the wing panels in accordance with the variations in speed.

2. In an airplane, the combination of a fuselage having oppositely extending wing panels provided with trailing sections movable vertically to vary the lift of said panels and with a tail plane having elevators movable vertically to control the center of pressure travel, means associated with each panel to move the movable sections thereof, a reversible motor for operating each of said means, means associated with the tail plane to move the elevators, a reversible motor for operating the last-named means, reversing switch means responsive to predetermined variations in the speed of the airplane to automatically place all of the motors in operation in the proper direction according to increase or decrease of said speed so as to change the center of pressure travel in accordance with the change in lift, further switch means operatively connected with a movable section of each wing panel to automatically render the first-named motors inoperative when the movable wing sections have been moved predetermined distances for varying the lift in accordance with the variations in speed, and still further switch means operatively connected with the elevators to automatically render the second-named motor inoperative when the elevators have been moved predetermined distances for changing the center of pressure travel in accordance with the changes in lift effected by the movement of the wing sections.

3. The construction defined in claim 1, in combination with manually operable reversing switch means for selectively controlling the operation and speed and the direction or relative directions of rotation of said motors to effect movements of the wing sections to secure any desired differential in lift of the wing panels.

4. The construction defined in claim 2, in combination with manually operable reversible switch means for selectively controlling the operation and speed and the direction or relative directions of rotation of said motors to thereby effect movements of the wing sections to secure any desired differential in lift of the wing panels.

WILLIAM J. HAMPSHIRE.

REFERENCES CITED

The following references are of record in the file of this patent:

UNITED STATES PATENTS

| Number | Name | Date |
|---|---|---|
| 1,413,553 | Stevens | Apr. 18, 1922 |
| 1,822,976 | Maxwell | Sept. 15, 1931 |
| 1,868,748 | Hogan | July 26, 1932 |
| 1,900,688 | Baum | Mar. 7, 1933 |
| 1,929,566 | Sanders | Oct. 10, 1933 |
| 1,942,688 | Davis | Jan. 9, 1934 |
| 1,982,242 | Bellanca | Nov. 27, 1934 |
| 2,120,717 | Sikorsky | June 14, 1938 |
| 2,146,014 | Grant | Feb. 7, 1939 |
| 2,262,968 | Schmidt et al. | Nov. 18, 1941 |
| 2,272,664 | Gropler | Feb. 10, 1942 |
| 2,286,150 | Mercier | June 9, 1942 |
| 2,298,040 | Davis | Oct. 6, 1942 |
| 2,346,464 | Tampier | Apr. 11, 1944 |

FOREIGN PATENTS

| Number | Country | Date |
|---|---|---|
| 474,065 | Great Britain | Jan. 17, 1936 |
| 485,069 | Great Britain | May 13, 1938 |
| 782,527 | France | Mar. 18, 1935 |